United States Patent

[11] 3,616,079

[72] Inventor  Rubin Goldman
               22 Park Drive, Newton Highlands, Mass.
               02161
[21] Appl. No. 826,838
[22] Filed     May 22, 1969
[45] Patented  Oct. 26, 1971

[54] GROMMETING MACHINE
     8 Claims, 7 Drawing Figs.
[52] U.S. Cl. ..................................... 156/497,
                       156/498, 264/154, 264/156
[51] Int. Cl. .................................... B32b 31/26
[50] Field of Search .......................... 156/497,
                       498; 24/141, 142; 264/154

[56]                 References Cited
               UNITED STATES PATENTS
| | | | |
|---|---|---|---|
| 2,032,923 | 3/1936 | Eldridge ....................... | 264/156 X |
| 2,423,237 | 7/1947 | Haslacher ..................... | 156/497 X |
| 2,957,793 | 10/1960 | Dickey ........................ | 156/82 |
| 3,015,600 | 1/1962 | Cook ............................ | 156/497 X |
| 3,159,695 | 12/1964 | Behringer .................... | 156/497 UX |

*Primary Examiner*—Samuel Feinberg
*Assistant Examiner*—G. E. Montone
*Attorney*—Wolf, Greenfield, Hieken & Sacks ABSTRACT: A grommeting machine with sealing tips having teeth that seal film sheets of plastic material together and simultaneously directs superheated air at the sheets to melt a hole in them.

PATENTED OCT 26 1971 3,616,079

INVENTOR.
Ruben Goldman
BY
Wolf, Greenfield, Hieken + Sacks

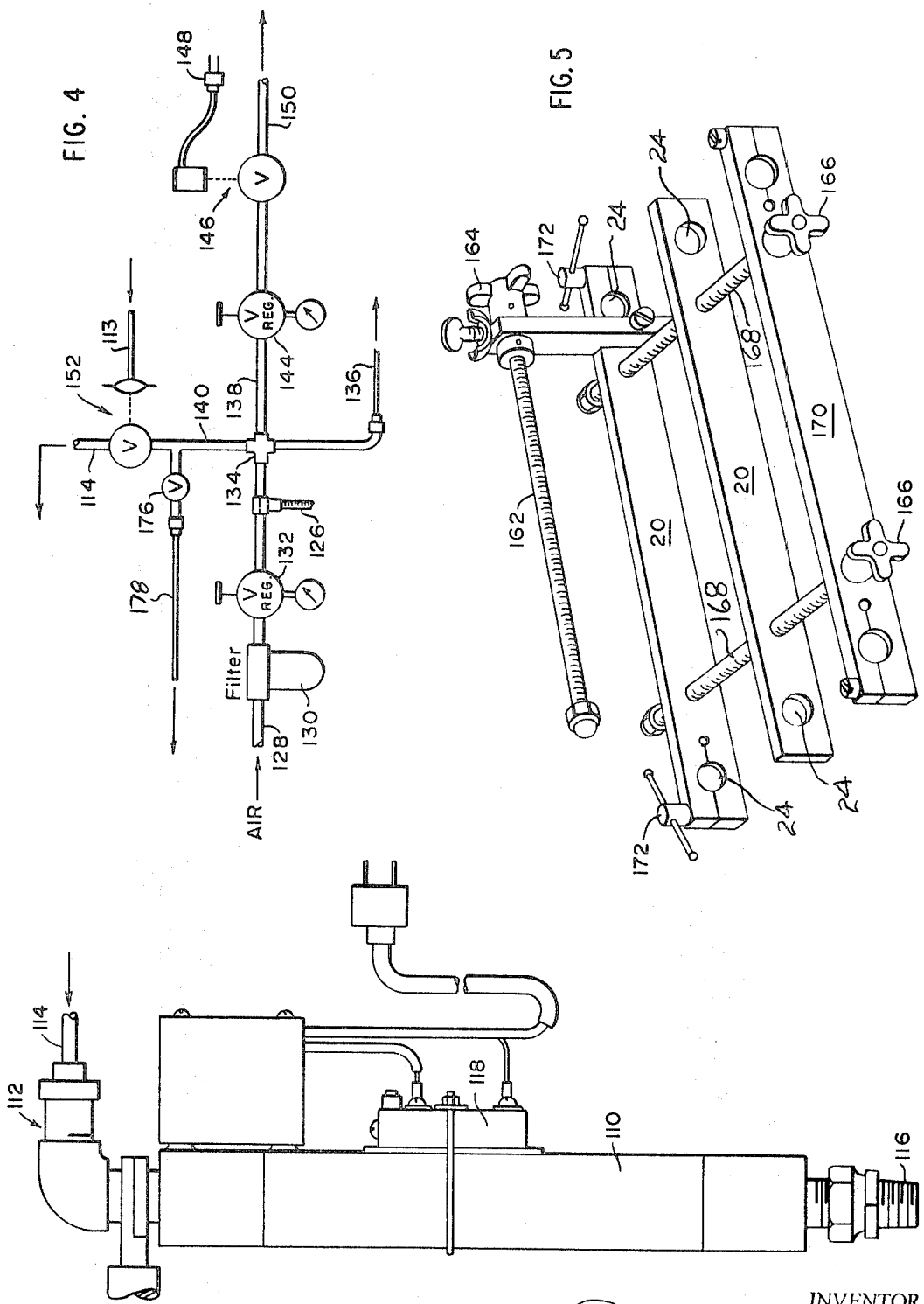

GROMMETING MACHINE

This invention relates to grommeting machines and more particularly comprises a new and improved machine for forming eyelet type openings in plastic materials without the use of external filler materials or metal eyelets. The machine has particular application in combination with converting machines used to make plastic bags, to form an eyelet in the bag headers.

At the present time eyelets are universally formed in bag headers by the use of either external filler materials or metal eyelets, and these operations are carried out separate from the converting machines used to form plastic sheet material into bags or packages. Those machines which use metal eyelets normally are limited to a speed of approximately 60 cycles per minute, and the metal eyelets are costly as compared to the other components of the bag.

One important object of this invention is to provide a grommeting machine for plastic materials, which is suitable for use with any intermittent converting machine. In use, the grommeting machine of this invention may be attached directly to the converting machine, and its operations may be performed as an integral part of the converting operations.

Another important object of this invention is to provide a grommeting machine which may operate at a speed of approximately 100 cycles per minute or more, and which eliminates the use of the metal eyelets and does not require plastic fillers.

Yet another object of this invention is to provide a machine which discharges the slugs formed by the holes to a remote location so that they do not subsequently mix with the material placed in the bag from which the plastic sheet is made or otherwise impair the bag itself.

Yet another important object of this invention is to provide a grommeting machine which enables a stiffening filler material to be used if desired when the packaged product weight demands extra rigidity, but which does not require the filler in order to form a suitable eyelet.

Still another important object of this invention is to provide a grommeting machine which has separate heaters so that the machine can form eyelets in multiple layers of dissimilar material.

To accomplish these and other objects, the grommeting machine of this invention includes a pair of sealing tips which are designed to be moved into close proximity with one another and sandwich one or more plastic sheets to be grommeted. Each of the tips is provided with a plurality of concentric rings which heat seal the layers of material together, and simultaneously the machine directs a burst of hot air within the innermost of the concentric rings to form the hole. In the preferred form of this invention, the innermost of the concentric rings melts the plastic material because the temperature of the innermost rings is higher than that of the outer concentric rings which form the heat-sealed rings. The machine is air actuated and may be controlled by a switch carried by the converting machine with which it is used in combination. The controls couple very easily to the converter so as to properly time the operating functions of both the converting machine and the grommeting machine with respect to each other.

These and other objects and features of this invention along with its incident advantages will be better understood and appreciated from the following detailed description of one embodiment thereof, selected for purposes of illustration and shown in the accompanying drawing in which:

FIG. 3 is a side view of the air heater used in combination with the apparatus of FIG. 2;

FIG. 4 is a diagrammatic view showing the air control console of this invention;

FIG. 5 is a perspective view showing the frame structure of this invention; and

Figure 1:
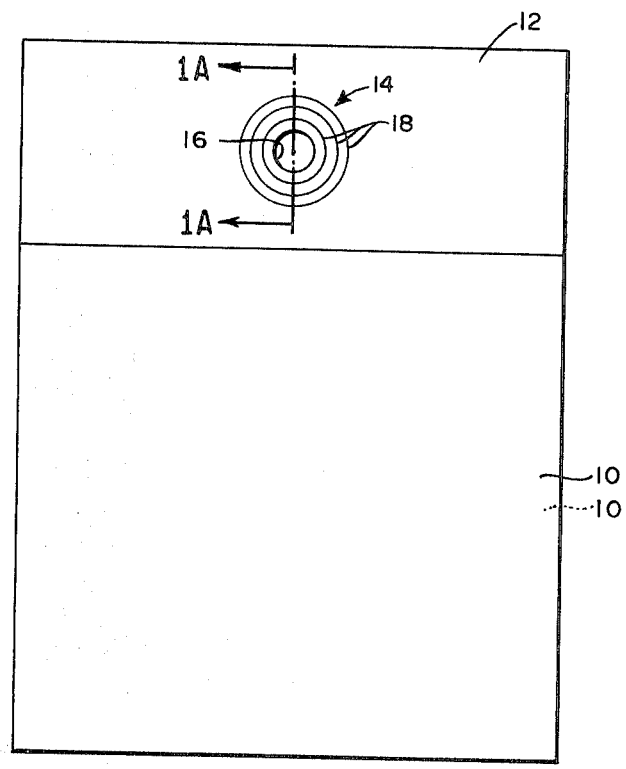
FIG. 1 is a plan view of a plastic bag having a header grommeted by the machine of this invention.
Figure 1A:
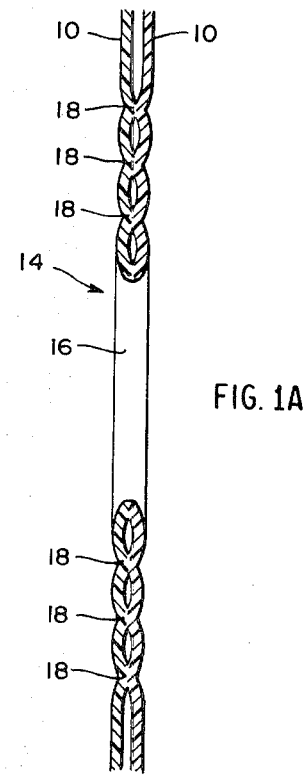
FIG. 1A is a cross section through the bag header taken on the section line 1A—1A of FIG. 1.

The bag shown in FIG. 1 is composed of a pair of plastic film sheets 10 and a header 12 in which is formed the eyelet area 14. As shown in FIG. 1A, the eyelet area 14 includes a central hole 16 through the sheets 10 and three concentrically sealed rings 18 about the hole. It will be noted that no additional material is used other than the plastic sheets themselves; that is, there is no metal eyelet or other filler material used. However, it is to be understood that a filler material may be used between the two sheets to give the header added stiffness and strength but the area 14 will be formed in precisely the same manner as illustrated in FIGS. 1 and 1A, except that the filler layer of material will lie between the two sheets 10 and will be pierced and heat sealed in the same fashion as shown.

The machine forming the eyelet area 14 is illustrated in the other drawings. The machine is carried on a pair of parallel horizontal mounting bars 20 which in turn may be mounted on the machine bars 22 which extend through the ends of the mounting bars 20. As shown in FIG. 5, the bars 20 are provided with holes 24 at their ends through which the machine bars 22 extend and which form part of the converting machine.

The mounting bars 20 carry a pair of spaced vertical plates 26 (one shown in FIG. 2) on which in turn are mounted fixed upper plate 28, pivotally supported lower plate 30 and pivotally supported lifter bar 32. Secured to the bottoms of the plates 26 is a base plate 34 which carries a bracket 36 that in turn bears the air valve 38.

The upper plate 28 secured to the vertical plates 26 by machine screws 40 has a vertical bore 42 at its outer end which is lined with a bushing 44 that supports upper tube 46 externally threaded at its upper end as shown at 48 and held in place by a hexagonal nut and swivel structure 50. A retaining block 52 is secured to the bottom of the upper plate 28 and carried heater 54 along with its thermocouple 56. The heater 54 is disposed closely adjacent to the sealing tip 58 on the lower end of the tube 46 and thereby provides heat to perform the sealing function described in detail below.

Figure 2:
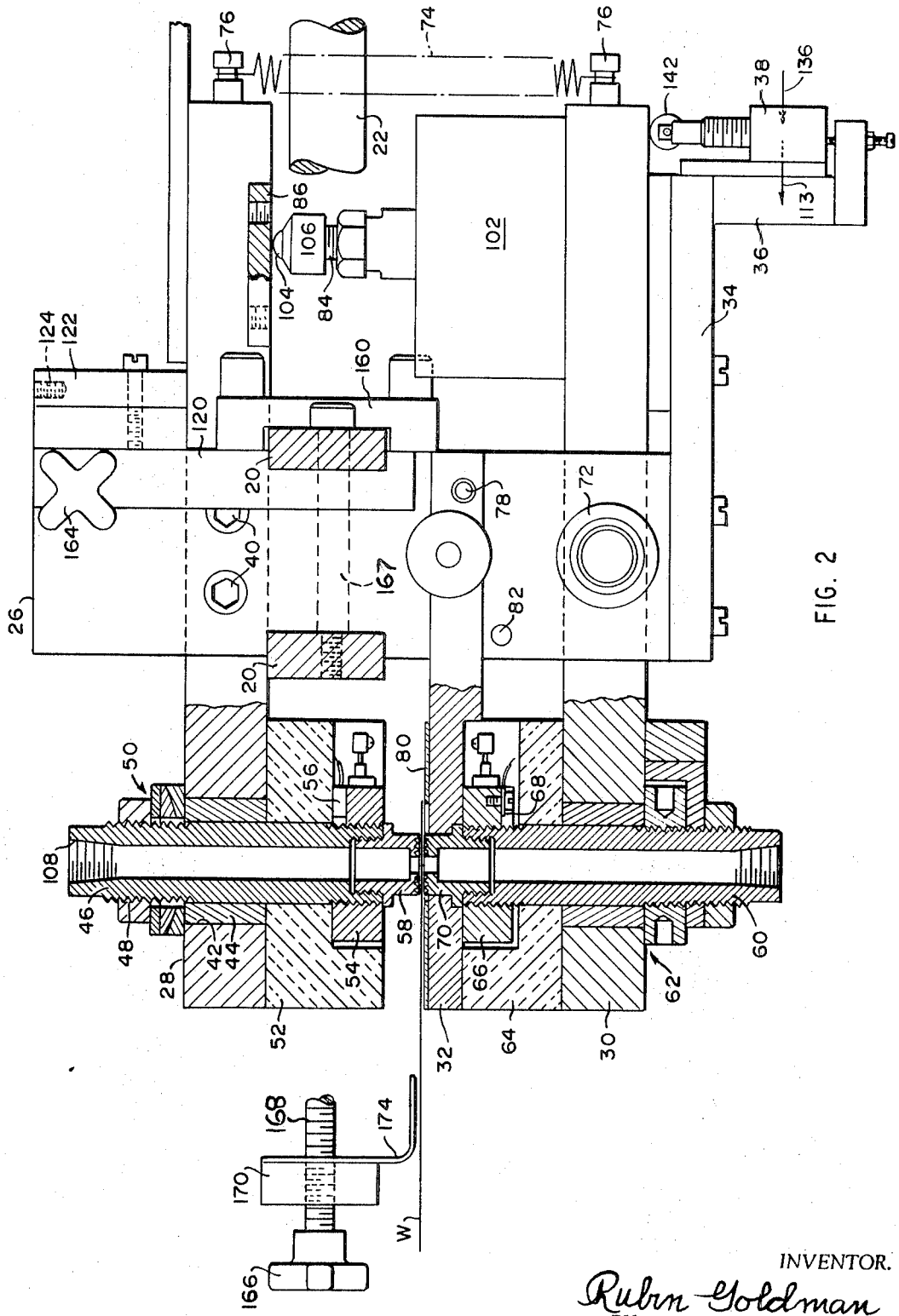
FIG. 2 is a side view, partly in section, of the grommeting machine of this invention.

The lower plate 30 carries a lower tube 60 axially aligned with the upper tube 46 when the upper and lower plates are in the position shown in FIG. 2. The lower tube is held in place by the adjusting assembly 62 and the lower block 64. The block 64 is similar to the block 52 on the upper plate 28 and carries a heater 66 with its thermocouple 68. The heater 66 is in close proximity to the lower sealing tip 70 aligned with the upper sealing tip 58.

The lower sealing tip 70 with its tube 60 and associated heater and thermocouple is pivotally movable about the bearing 72 that supports the lower plate 30 on the main vertical plates 26. A heavy spring 74 connected between the screw spring posts 76 attached to the rear ends of the upper and lower plates 28 and 30 biases the lower plate 30 to an inoperative position wherein the sealing tip 70 is dropped from the position shown in FIG. 2 and is spaced an inch or two below the upper sealing tip 58. The tension of the spring 74 must be overcome to move the parts to the operative position shown in FIG. 2.

The lifter bar 32 disposed between the top and bottom plates 28 and 30 is pivotally supported by bushing 78 on the vertical plates 26 and carries on its upper surface lifter plate 80 which actually supports the web of film plastic material W that slides between the sealing tips 58 and 70 when the tips are spaced apart. A stop 82 on the vertical plate 26 limits the downward movement of the lifter bar 32, and the bar 32 is moved to the position shown in FIG. 2 by direct contact with the assembly carried on the lower plate 30. The lower plate 30, however, is allowed to pivot a greater distance counterclockwise than the lifter bar 32 so that when the assembly moves under the influence of spring 74 the intermediate bar 32 drops to the stop 82 and the assembly carried on the lower plate 30 travels a further distance downwardly and separates from the bar 32. The counterclockwise movement of the lower plate 30 is limited by engagement of the piston 84 with the bearing surface 86 on the underside of the top plate 28.

Figure 6:
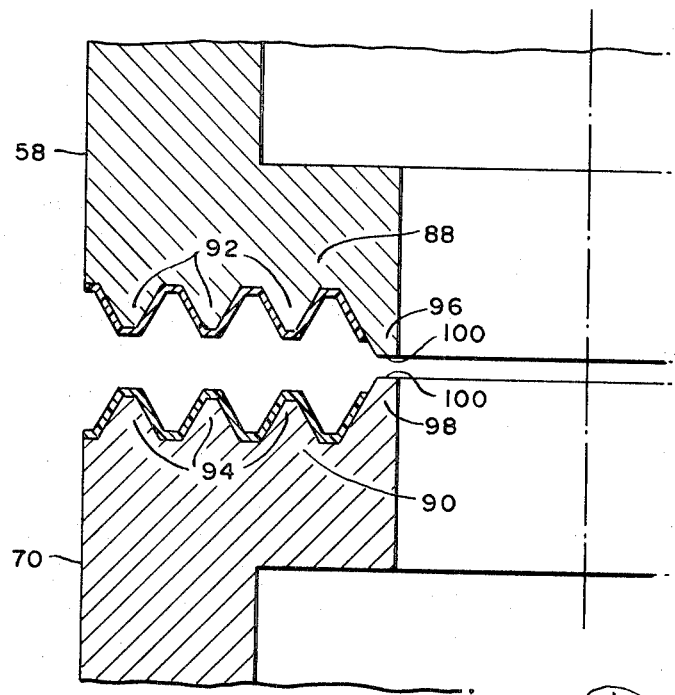
FIG. 6 is a cross-sectional view of the sealing tips of the machine.

In FIG. 6 the tips 58 and 70 are shown in detail. The tips are shown to be made of steel and have on their facing surfaces 88 and 90, respectively, four concentric teeth. The three outermost concentric teeth 92 on the tip 58 are spaced approximately 0.016 inch from the teeth 94 on the tip 70 when the tips are in the operative position of FIG. 2, while the innermost of the concentric teeth 96 and 98 on the tips are spaced apart only approximately 0.003 inches when the tips are in that position. The teeth 92 and 94 along with the intermediate spaces are coated with Teflon or some similar material to prevent the film plastic material W from sticking to these teeth when they heat seal the film, but inner ends 100 of the teeth 96 and 98 are uncoated and therefore are at a higher temperature and partially melt the film when pressed against it. The crown of the teeth 92 are spaced apart radially approximately 0.080 inches so that the concentric sealing rings 18 as shown in FIGS. 1 and 1A lie about one-sixteenth inch apart.

While the spring 74 urges the upper and lower plates 28 and 30 along with the intermediate bar 32 to a spaced-apart position, the pancake cylinder 102 carried on the rear end of the lower plate 30, in cooperating with the piston 84, serves to move the several plates to the position shown in FIG. 2. When air is directed to the cylinder 102, the piston 84 is moved to an extended or elevated position and bears against the bearing surface 86 on the upper plate 28 to achieve this objective. A rotating ball 104 captured within the cage 106 on the top of the piston 84 allows the piston assembly 84 to move left and right as viewed in FIG. 2 against the bearing surface 86 as the lower plate 30 pivots in response to actuation of the cylinder 102.

The assembly shown in FIG. 3 which comprises the heater assembly for air directed through the upper and lower tubes 46 and 60 is screwed into the threaded upper end 108 of the upper tube 46. The assembly includes a blow heater 110 with a coupling 112 at its upper end to direct air through the blow heater tube. A duct 114 connected to the coupling 112 in turn is connected to the gas supply and control assembly of FIG. 4. Swivel 116 connected to the lower end of the blowtube 110 is threaded into the section 108 on the upper tube 46 to mount the parts in place. When air is directed through the blowtube 110, it is heated to a super heated temperature above the melting temperature of the web W, and the gas directed through the tube 46 impinges against the web within the area defined by the inner teeth 96 and 98 on the tips 58 and 70, respectively so as to literally melt the hole in the plastic. The temperature of the gas is controlled by directly controlling the temperature of the blow heater 110. Thermostats 118 on the tube prevent the system from overheating.

Bracket 120 disposed adjacent the rear mounting bar 20 carries a second bracket 122 having an internally threaded hole 124 at the top which receives the externally threaded mounting rod 126 forming part of the control assembly of FIG. 4. The control assembly includes an air inlet 128 (connected to a compressor or other suitable source not shown) which directs the air through a water filter 130 and a pressure regulator 132 to a cross connection 134 that routes the air from the regulator 132 in three different directions represented by the pipes 136, 138 and 140. The regulator 132 controls the pressure of the air through the system.

The pipe 136 is directly connected to the air valve 38 carried on bracket 36 attached to the vertical plates 26, and the air valve in turn is opened by engagement of the rear of the lower plate 30 with the valve stem 142 resulting from clockwise movement of the lower plate in response to actuation of the cylinder 102. The air from the pipe 136 which passes through the air valve 38 in turn is directed into the pilot line 113 of the air heater assembly of FIG. 3 to open valve 152. Thus, when the plate is moved to the operative position shown in FIG. 2, the air valve 38 is opened which activates the pilot of valve 152, and air from the inlet 128 is allowed to flow through the pipe 140 into the super heater 110 and pierce the hole in the web W within the inner teeth 96 and 98 of the tips 58 and 70, respectively.

The pipe 138 leaving the cross connection 134 is interrupted by a pressure gage 144 and a solenoid valve 146 which may in turn be connected directly to the converting machine (not shown) by means of plug 148. The outlet of the valve 146 in the form of pipe 150 is connected to the pancake cylinder 102 and thus supplies the gas used to move the lower plate 30. When the converting machine with which the grommeting machine of this invention is used provides a signal to start the grommeting machine in operation, the solenoid valve 146 opens to allow pressurized air to flow through the cylinder 102 to pivot the bottom plate 30 clockwise so as to move it into the operative position shown in FIG. 2.

The valve 152 connected to the pipe 140 interrupts the flow of air from the source to the blow heater 110. The valve 152 is controlled by the pilot 113 which in turn is triggered by the discharge of air through the valve 38 as explained above. Therefore, when the lower plate 30 is moved to the position shown in FIG. 2, and the valve 38 is thereby opened, the air which flows through the open valve 38 triggers the valve 152 to in turn supply air to the blow heater 110 from the source 128.

FIG. 5 shows many of the adjustments which may be made in the assembly. Referring to FIG. 2 and 5, it will be observed that by loosening the clamp 160 the vertical plates 26 may be moved by the threaded rod 162 rotated by handle 164. Thus, the sealing tips 58 and 70 and their associated parts may be moved horizontally perpendicular to the plane of the paper as viewed in FIG. 2 by means of the rod 162 and handle 164 that provides a micrometer adjustment. Front and rear movement of the tips 58 and 70 with their associated parts is controlled by the handle 166 of which two are provided as shown in FIG. 5. The handles 166 are connected to threaded rods 168 that in turn are connected by spacer 167. When the handle 166 is rotated, the threaded rods 168 do not move axially because of the collar which attaches them to the front horizontal bar 170. Their rotation causes the bars 20 to move back and forth along the machine bars 22 which extend through the openings 24. The clamps 172 shown in FIG. 5 must be loosened in order to move the bars 20 on the machine bars 22.

In operation the machine of this invention functions as follows:

First, the operator adjusts the position of the tips 58 and 70 by means of the handles 164 and 166 which afford horizontal adjustment for the bars in mutually perpendicular planes. When the tips 58 and 70 are properly positioned, the machine is ready to function. At rest, the intermediate lifter bar 32 and the lower plate 30 are both in their lowermost positions with the two spaced from one another so that the tip 70 lies below the surface of the plate and is also spaced from the tip 58. In this position the web may be drawn freely over the plate 80 on the bar 32 without sticking to the tips which may be at an elevated temperature. Because the intermediate bar 32 is spaced below the upper tip 58, the web W which travels over it is also spaced from the upper tip 58 so that no contact takes place at that point which could cause sticking. Another guide plate 174 is carried by the bar 170 at the front of the machine to prevent the web W from rising above the desired level and thereby further assists in keeping the web away from the upper tip.

Upon receiving a signal from the converting machine which is conveyed through the plug 148 to the solenoid valve 146, air is directed to the solenoid 102 which instantaneously elevates the lower plate 30 and the intermediate bar 32 to the position shown in FIG. 2. With the plates in that position, the tips 58 and 70 are positioned as shown in FIG. 6, and the teeth 92 and 94 form the concentric sealed rings 18 in the web while the teeth 96 and 98 partially melt the plastic material because of their higher temperatures. The Teflon coating being absent from the teeth 96 and 98, the teeth are at a higher temperature which approaches the melt temperature of the plastic film.

When the lower plate 30 assumes the position of FIG. 2, the valve 38 is actuated to an open position and air flows from the pipe 136 through the valve and triggers the valve 152 on the console of FIG. 4. This opens the valve 152 to allow air to flow from the source 128 through pipe 114 and flow heater 110. The super heated air from the heater 110 passes down the pipe 46 and melts the hole in the plastic material within the area defined by the teeth 96 and 98. The thermocouples 118 on the blow heater 110 and the thermocouples 56 and 68 with the heaters 54 and 66 on the tips control the temperature of the super heated air as well as the temperature of the tips to assure proper function of the various parts of the assembly. The dwell time of the machine in the operative position may be determined either by the converting machine itself or by an intermediate timer (not shown) which is connected in circuit with the solenoid 146. It is evident that when the solenoid 146 closes, air pressure will be relieved from the cylinder 102 and allow the plates to move under control of the main spring 74, which in turn causes the tips to separate and the bar 32 to drop.

In FIG. 4 yet another air passage 178 is shown having a valve 176. This passage which is connected to the pipe 140 directs a breath of air to the vicinity of the heating tips and prevents them from overheating when the machine stops. This air is in the form of a mild jet which is directed at the location of the tips 58 and 70 to give additional control over temperatures.

As described, the teeth 96 and 98 in the operative position may be approximately 0.003 inch apart while the spacing of teeth 92 and 94 may be approximately 0.016 inch. These figures are suitably for a bag having a header thickness of approximately 0.008 inch. If the stock varies appreciably from that thickness, the gaps between the teeth may be suitably adjusted. It is, however, to be evident that the teeth 96 and 98 actually compress the web stock as it partially melts it. The separate thermostats 56 and 58 allow the temperatures of the tips to be separately regulated particularly when the web is comprised of different materials.

Having described the machine in detail along with the products made therefrom, the invention is set forth in the appended claims as follows:

1. A grommeting machine comprising
   a frame and a pair of tip supports carried by the frame,
   a heat sealing tip carried on each support and having sealing teeth formed therein to cooperate with each other to seal a film sheet disposed between them,
   means moving the tip supports relative to each other to move the tips between operative and inoperative positions,
   at least one of said heat sealing tips having means defining a passage for passing heated air,
   and a heated air source connected to the passage of the tip for melting a selected area of the film disposed between the tips to make a hole in the film,
   at least one of said tips having at least one endless tooth to define the area to be melted in the film.

2. A grommeting machine as described in claim 1 further characterized by
   said at least one endless tooth being at a temperature to partially melt the film.

3. A grommeting machine as described in claim 2 further characterized by
   each of the tips having additional teeth outside the at least one endless tooth which heat seal the film but do not melt it so as to attach two or more layers of film together.

4. A grommeting machine as described in claim 3 further characterized by
   means maintaining the additional teeth at a lower temperature than the at least one endless tooth.

5. A grommeting machine as described in claim 3 further characterized by
   said tips being aligned axially and being annular in shape, said air being directed through the tips from one to the other and through the film between.

6. A grommeting machine as described in claim 5 further characterized by
   said tips being disposed one above the other,
   the tip support for the lower tip being movable so as to move the lower tip toward and away from the upper tip,
   spring means connected to the lower tip support for urging the lower tip to the inoperative position away from the upper tip,
   pneumatic means connected to the lower support and when actuated overcoming the spring to move the tips to their operative position,
   and a plate disposed between the two supports and movable independently of the lower support for carrying the film when the tips are separated.

7. A grommeting machine as described in claim 6 further characterized by
   a valve controlling the flow of heated air to the tips,
   and means including a pilot connected to the valve for opening and closing the valve in response to movement of the lower tip to the operative position.

8. A grommeting machine as described in claim 3 further characterized by
   said additional teeth being coated with a material which prevents those teeth from sticking to the film and lowers their surface temperature with respect to the at least one endless tooth.